June 23, 1931.  C. B. HARPER  1,811,390
AIRCRAFT
Filed April 6, 1929  2 Sheets-Sheet 1

INVENTOR
Carl B. Harper;
BY Eyre Scott & Keel
ATTORNEYS

June 23, 1931.  C. B. HARPER  1,811,390
AIRCRAFT
Filed April 6, 1929  2 Sheets-Sheet 2
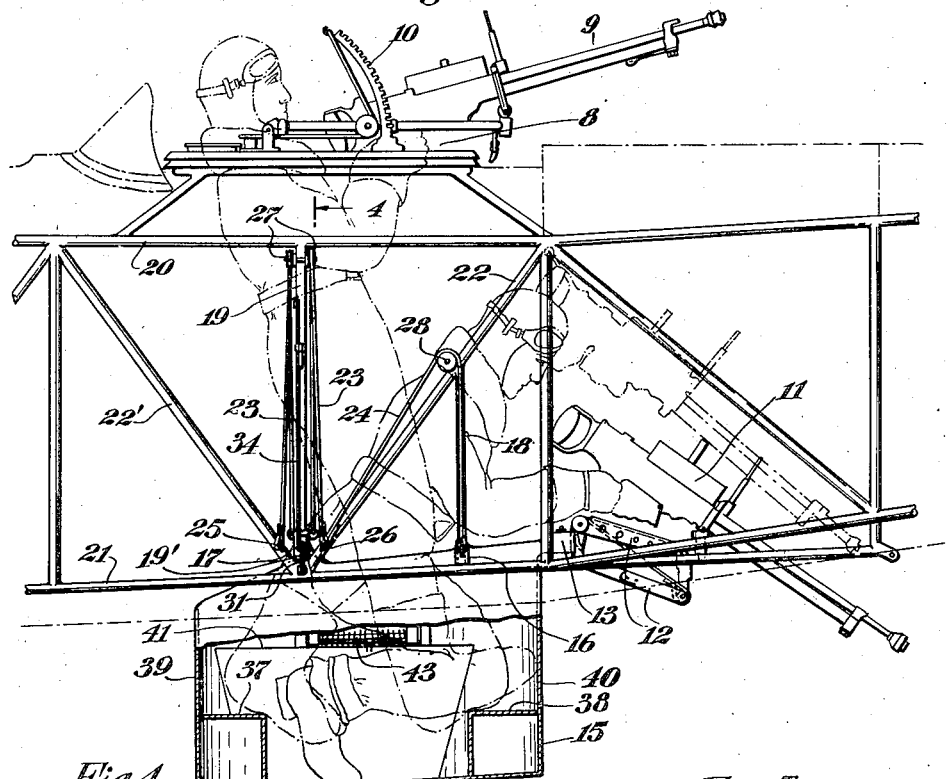
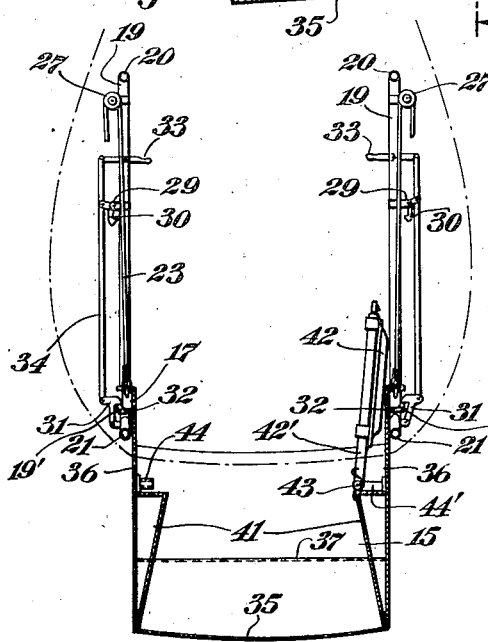
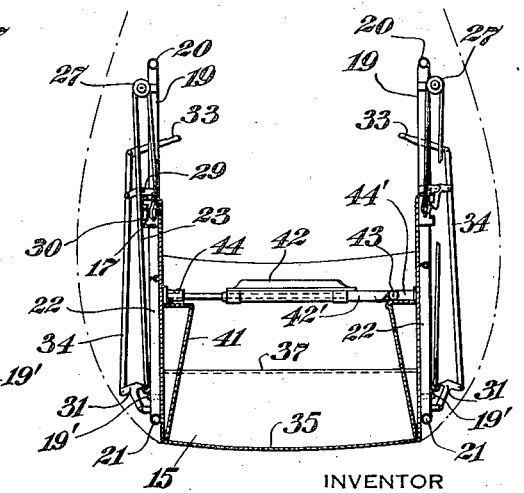
INVENTOR
Carl B. Harper,
BY
ATTORNEYS Patented June 23, 1931

1,811,390

UNITED STATES PATENT OFFICE

CARL BROWN HARPER, OF WASHINGTON, DISTRICT OF COLUMBIA

AIRCRAFT

Application filed April 6, 1929. Serial No. 352,945.

This invention relates to military aircraft and particularly to airplanes.

In standard scout and fighting planes, the fuselage is of relatively small depth and the gunner's compartment or compartments are necessarily crowded with the result that the deck and tunnel guns are maneuvered with great difficulty and particularly within certain ranges. For example, the gunner operating the deck gun is unable from his cramped and stooping position to maneuver and fire the gun with the freedom of movement desired and particularly with the gun on the lowest notches of the gun mount segments, while the tunnel gun may be maneuvered with even greater difficulty due to the necessary squatting position of the gunner, and the practical effect is that the maximum possible range and accuracy of fire are substantially reduced due to these difficulties. The object of the invention is a fuselage and cockpit construction permitting the easy and ready maneuvering and accurate firing of either or both the deck and tunnel guns of standard types and mount throughout their maximum possible range, and without increasing the normal depth of the fuselage or the normal size of the cockpits. The invention resides further in a construction of this general character which can be readily and economically incorporated in a standard machine with a minimum of changes and with no change in the gun mount or support.

For a better understanding of the invention reference may be had to the accompanying drawings forming a part of this application wherein:

Fig. 3 is a view similar to Fig. 2 showing the guns in action,

Fig. 4 is a sectional view along the lines 4 of Fig. 3,

Fig. 5 is a sectional view along the lines 5 of Fig. 2, and

Figure 1:
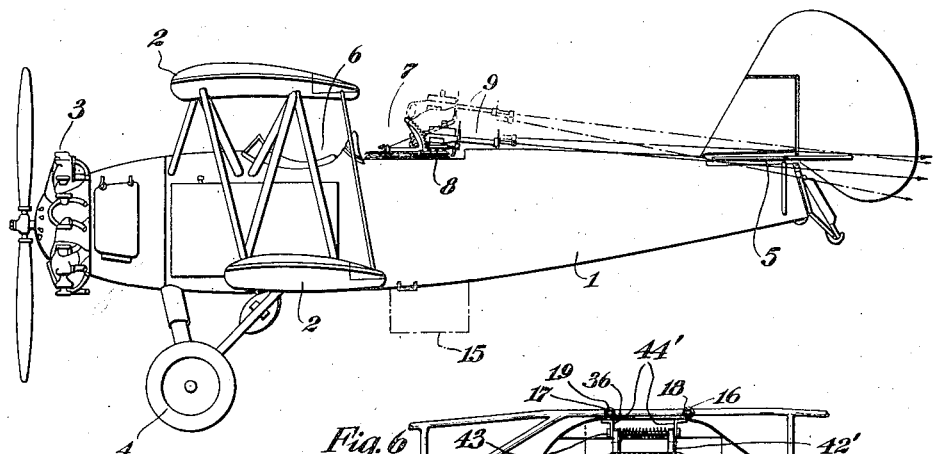
Fig. 1 is a side view of an airplane embodying the invention.
Figure 6:
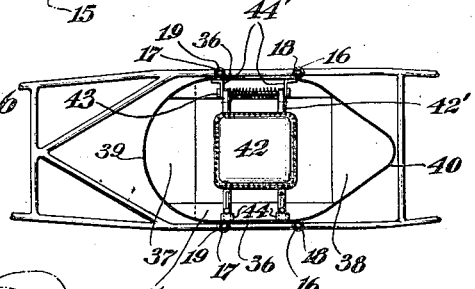
Fig. 6 is a plan view of the fuselage with certain parts broken away.
Figure 2:
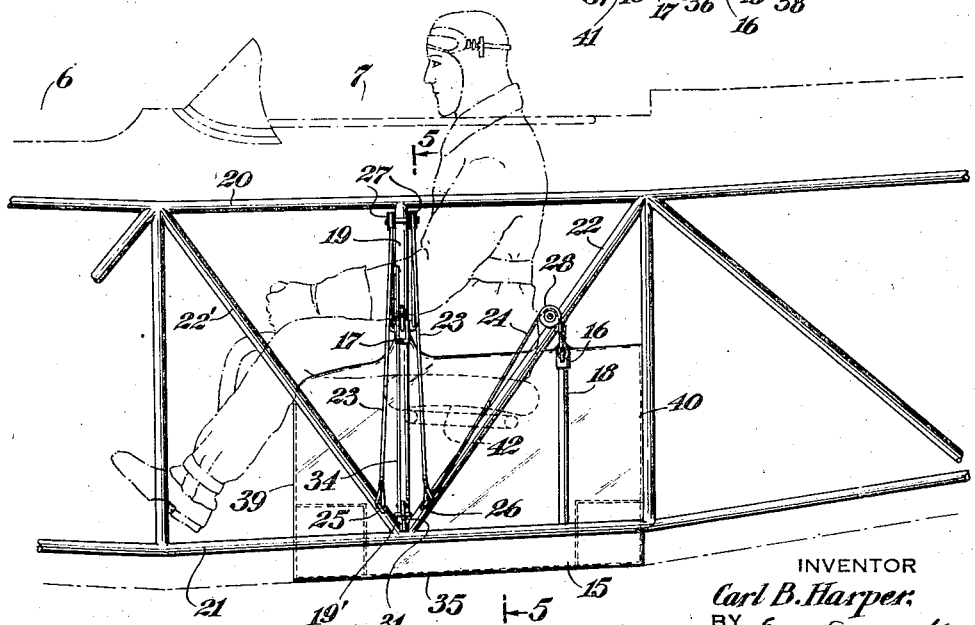
Fig. 2 is a side view of a part of the fuselage and parts thereof broken away.

I have illustrated my invention as being embodied in an airplane having a fuselage 1, upper and lower wings 2, a power plant 3, a landing gear 4 and a tail control unit including a horizontal fin and an elevator structure 5. The machine illustrated is a two place machine having a forward cockpit 6 and a rear cockpit 7. About the upper part of the latter cockpit is disposed a standard gun mount 8, the gun mount being liftable and lowerable about a segment or segments 10 and the gun, of course, is universally mounted for maneuvering in all planes while at any level on the segments. A tunnel gun 11 is provided just to the rear of the cockpit 7 and this gun 11 is carried by a parallelogram mount 12 which is swivelled about a support at 13 carried by the framework of the fuselage 1.

The fuselage 1 is of the small depth and small dimensions desired for fighting or scout planes of the character indicated and the cockpit 7 is of such small dimensions both in depth and laterally as to render it difficult for the gunner or gunners to operate and accurately fire the guns through their maximum range and this condition is aggravated by the equipment ordinarily contained in the cockpit. I have, therefore, devised a body or fuselage construction which enables the gunner or gunners to operate either or both the deck and tunnel guns with a minimum of effort and inconvenience and with greater accuracy of fire. To this end I have devised a special lowerable platform 15 in the cockpit 7 for the gunners, this platform 15 being normally held in a position within the cockpit 7 with the bottom surface thereof forming a continuation of the bottom surface of the fuselage, but being adapted to be dropped down to the position indicated in Figs. 3 and 4 to facilitate the gun operations. The gunner, while assuming a kneeling position as indicated upon the lowered platform, may get at and effectively handle and maneuver the tunnel gun 11 throughout its whole range. The same lowered platform may be used by the gunner operating the deck gun 9, the gunner in this case being able to remain in a standing position and effectively operate the deck gun even from its lowermost level on the segments 10 of the gun mount. The platform 15 is preferably co-extensive with the width of the cockpit 7 and is conveniently carried by two pairs of guiding sleeves 16 and 17 on either side, the sleeves 16 being guided along vertical fuselage frame members 18 and the sleeves 17 being guided along vertical fuselage frame members 19. The frame members 19 may be of the usual tubular vertical frame members bridging the upper and lower longerons 20 and 21. The sides 18 are welded or otherwise fastened at their lower ends to the longerons 21 and at their upper ends to the diagonal braces or frame members 22. The platform 15 is preferably biased in an upward direction at all times so as to provide for the lifting of the same without effort on the part of the gunner. For this purpose I have shown the frame as normally sustained in its upward position by means of elastic cords 23 and 24 there being two sets of these cords one on either side of the platform. The elastic cords 23 are in pairs and are fastened at one end at the points 25 and 26 to the fuselage frame structure. The elastics then pass over pulleys 27 and then are fastened at their other ends to the opposite sides of a sleeve 17, the guide pulleys 27 being carried by any part of the frame-work, for example, by the vertical frame members 19. Similarly the elastics 24 are connected at one end to the fuselage frame at the point 26 and pass over pulleys 28 carried, as for example, by the diagonals 22 the other ends of the elastics being connected to the sleeves 16. Any suitable lower and upper stopping and limiting means may be provided for the platform and in the particular embodiment shown the sleeves 16 engage the longerons 21 in their lowermost position while the guides 17 engage and are stopped in their lowermost position by the stops 19' on the vertical member 19. Similarly any suitable stopping devices or means may be provided for the upper limit and in the particular embodiment shown the sleeves 16 are arrested in their movement by engagement with the diagonals 22 while, if desired, lugs 29 may be provided on the vertical frame members 19 to arrest the upward movement of the sleeves 17 when the platform is moved up by the elastic cord means shown. Any suitable means may be also provided for locking the platform in its upper and lower positions, as for example the upper latches 30 and the lower latches 31 for engaging the lower and upper sides of lugs 32 formed on the guide sleeves 17. I have also indicated a hand control means 33 for disengaging and engaging the latches 30 and 31 and locking the platform in either of its operative positions against movement. In the particular embodiment shown the latches 30 and 31 are in the form of bell crank levers which are pivoted to the vertical frame members 19 and which are connected by links 34 the latter being operative by the hand lever operating means 33. By pressing downwardly on the hand control device 33 the upper latches are disengaged and by lifting up upon the levers the lower latches 31 are disengaged and the latches as usual are provided with bevelled surfaces on their backs to facilitate the automatic locking engagement.

In the particular embodiment shown the platform 15 is mounted in the rear of the cockpit in order to enable the gunner to kneel closely to the tunnel gun 11 when the platform is brought to its lowest position. The platform is provided with a floor 35, vertical side plates or walls 36, transverse fore and aft steps 37 and 38 and the fore and aft streamlined walls 39 and 40, the side walls 36 carrying the guide sleeves 16 and 17 and forming the main support for the platform. The side walls 36 also carry fore and aft extending steps 41 disposed at a higher level than the steps 37, 38. A seat structure 42 is carried by transverse members 42' which in turn are carried by the sides 36 of the platform, the members 42' being pivoted on axis 43 on one side to the parts or lugs 44' (welded to a side 36) to permit movement of the seat to one side out of the way when the platform is to be lowered for use. The seat support members 42' when down engage at their free ends the socket or spring holding members 44 which are welded to a side member or wall 36.

Normally the platform 15 is supported substantially on a level with the lower longerons 21 the elastic cord means biasing the platform to its uppermost position and the latches 30 engaging and positively holding the platform in its upper position. When it is desired to engage in gun practice the platform is unlocked, seat 42 is moved over to one side and the gunner by resting his foot upon the platform carries it down to its lowermost position against the tension of the elastic cords and there it is locked in this position by the latches 31. This increases the effective depth of the fuselage at this point and enables the gunner while in full standing position and with very little stooping necessary to operate the deck gun 9 from any level, the gunner being entirely free from cramped or inconvenient positions. Moreover, as indicated in Fig. 1, it enables the deck gun to be effectively operated from its lowest level namely substantially on a level with the horizontal tail control 5, thereby reducing the angle of obstruction due to the horizontal control to a minimum. As indicated in Fig. 3 the gunner by kneeling down on the lowerable platform may maneuver and handle the tunnel gun 11 throughout its maximum range with a minimum of effort and discomfort.

By disengaging the latches 31 and removing the weight from the platform it is automatically returned to its upmost position by the elastic cord lifting means.

The construction and arrangement shown does not add appreciably to the weight of the body or fuselage and is entirely safe, and is further characterized by its simplicity in construction, small number of parts and the ease and facility with which it may be embodied in standard machines.

While I have shown my invention as embodies in an airplane it is understood that certain features thereof are equally applicable to aircraft of the lighter than air type.

I claim:

1. In an airplane a body having a gunner's compartment therein, a deck gun mount near the upper part of said compartment, a tunnel gun mount adjacent the lower part of said compartment, a lowerable platform in the compartment adjacent the tunnel gun mount which is normally on a level with the bottom of the body, said platform being movable independently of the gun mounts to a position substantially lower than the compartment floor upon which platform the gunner may stand to operate a gun on the deck mount or may kneel to operate a gun on the tunnel mount.

2. In an airplane of the character set forth in claim 1 wherein means are provided for yieldingly urging the movable platform in an upward direction together with means for locking the platform either in the upper position or the lower position.

3. In an airplane a body having a gunner's compartment therein, a tunnel gun mount adjacent the bottom of said compartment, said compartment including a platform which is normally on a level with the bottom of the body but which is movable to a position substantially below its normal level and below the level of the gun mount to facilitate the maneuvering of the gun by the gunner resting upon the lowered platform.

4. In an airplane of the character set forth in claim 3 wherein means are provided for locking the movable platform in its upper and lower positions together with elastic means for automatically retracting the floor to its upper position.

5. In an airplane of the character set forth in claim 3 wherein means are provided for locking the movable platform in its upper and lower positions together with elastic means for automatically retracting the floor to its upper position, said platform being provided with sleeve guiding means which traverse fixed guides on the body framework.

6. In an airplane a fuselage having a gunner's compartment therein, a gun mount carried by the craft, a seat in said compartment which is movable to one side thereof to an inoperative position a lowerable supporting platform means in said compartment which normally occupies a position on a level with the bottom of the fuselage but which is retractable independently of the gun mount to a position substantially below its normal level whereby the gunner may by supporting himself upon the lowered supporting platform means and with the seat moved to one side conveniently and effectively operate the gun throughout its range.

7. In an airplane of the character set forth in claim 6 wherein a tunnel gun mount is provided adjacent the movable platform supporting means whereby the gunner may by kneeling upon the lowered platform means operate and maneuver the tunnel gun throughout its range.

8. In an airplane of the character set forth in claim 6 wherein a tunnel gun mount is provided adjacent the movable platform supporting means whereby the gunner may by kneeling upon the lowered platform operate and maneuver the tunnel gun throughout its range, the platform being provided with means for streamlining it into the fuselage in the lower position.

9. In an airplane of the character set forth in claim 1 wherein means are provided for locking the movable platform in its upper and lower positions together with means for yieldingly urging the platform in an upward direction.

10. In an airplane of the character set forth in claim 1 wherein means are provided for locking the movable platform in its upper and lower positions together with means for yieldingly urging the platform in an upward direction, said platform being guided in its movements by sleeves sliding on vertical frame members of the body.

11. In an airplane of the character set forth in claim 1 wherein means are provided for streamlining the lowered platform into the bottom of the body.

12. In an airplane of the character set forth in claim 1 wherein the platform is provided with steps for the purpose set forth.

13. In an airplane of the character set forth in claim 1 wherein a seat is carried by the platform.

14. In an airplane of the character set forth in claim 1 wherein a seat is carried by the platform and is pivotally mounted for movement from its operative position.

15. In a high speed airplane a fuselage having fixedly mounted thereon a deck gun mount support and a tunnel gun support together with a cockpit which normally has the depth of the fuselage but is capable of extension at the will of the gunner independently of the gun mounts for facilitating the maneuvering of the guns.

16. An aeroplane of the character set forth in claim 6 wherein the seat is carried by the lowerable supporting platform means.

17. In an aeroplane of the character set forth in claim 3 wherein the movable platform is disposed in the rear of the compartment adjacent the tunnel gun.

In testimony whereof, I have signed my name to this specification.

CARL BROWN HARPER.